J. W. HASBURG.
METHOD OF STAINING GLASS.
APPLICATION FILED JUNE 18, 1919.

1,328,833.

Patented Jan. 27, 1920

Witness:
Harry J. Gaither

Inventor:
John W. Hasburg
by Chamberlin & Freudenreich
Attys

UNITED STATES PATENT OFFICE.

JOHN W. HASBURG, OF CHICAGO, ILLINOIS.

METHOD OF STAINING GLASS.

1,328,833.  Specification of Letters Patent.  Patented Jan. 27, 1920.

Application filed June 18, 1919. Serial No. 305,158.

*To all whom it may concern:*

Be it known that I, JOHN W. HASBURG, a citizen of the United States, residing at Chicago, county of Cook, State of Illinois, have invented a certain new and useful Improvement in Methods of Staining Glass, and declare the following to be a full, clear, and exact description of the same, such as will enable others skilled in the art to which it pertains to make and use the same, reference being had to the accompanying drawings, which form a part of this specification.

Glass staining is commonly practised by coating such parts of the piece of glass or ceramic ware, as it is desired to color, with a composition applied in a plastic or semi-liquid state by means of a brush or otherwise; the coated ware being then baked or burned in a suitable muffle in a proper manner. After burning, the composition is washed off the ware, leaving a stain or color in those portions of the ware to which the composition was applied. These coating compositions are usually made from a clayey material, such as yellow ocher, metallic salts or bases, charcoal, glucose, or molasses and enough water to give a creamy consistency to the composition so that it can be applied to the ware with a brush, like a paint.

The foregoing method produces a very uniform and flat tint of color on the ware. Furthermore, it is of no consequence whether or not the coating be evenly applied because an even staining effect seems to be obtained even though the coating of staining material varies greatly in thickness at different points. Consequently it is not possible to work out designs and vary the decorative effect from a uniform flat tint by making the coating of staining material thicker at some points than at others.

My invention has for its object so to modify the foregoing process as to permit designs and variegated color effects to be produced on glass and glazed ceramic ware.

In carrying out my invention I first coat the ware, or the parts thereof to be treated, with a foundation material and then apply metallic salts or bases in any desired variegated or decorative form directly upon the coating. The ingredients of the foundation material and the vehicle carrying the metallic salts or bases are so chosen that the metallic salts or bases will soak properly into the foundation material; the extent and character of the impregnation depending upon the strength, manner and form of application of the salts or bases to the foundation material. The foundation material may be any of the usual clay-like coloring compositions or be any other suitable material, depending upon the nature of the work. The foundation coating is dried more or less before the coloring salts or bases are applied, depending upon the character of the work and the nature of the coloring and foundation materials.

If the foundation coating is intended simply to serve as an agent for holding the elements afterward applied for decorative purposes it may conveniently be made by mixing powdered ocher and charcoal with sufficient glucose to make a paste, about four parts of ocher being used to one part of charcoal. If the foundation coating is intended to give a tint to the ware, a metallic salt such, for example, as copper sulfate may be added to the mixture just described; about six parts of copper sulfate being mixed with four parts of ocher, one part of charcoal and sufficient glucose to make a paste. The ingredients for the foundation coating are preferably ground in water to a smooth paint.

The materials for application to the foundation coatings may be dissolved in or mixed with water, alcohol, turpentine or other suitable liquid.

By my improved method artistic decorations may be produced in great variety in monotone or in a combination of colors, in a single burning, since all of the coloring salts or bases may be applied before a burning operation, and therefore a single burning operation will suffice even though a decoration be worked out in a plurality of colors.

In the accompanying drawing I give an illustration of the manner in which my invention may be carried out. In said drawing, Figure 1 is a side elevation of a bowl adapted to be decorated;

Figure 1:
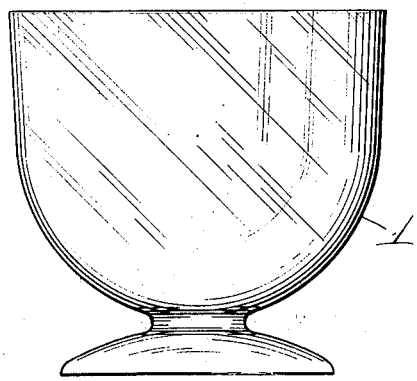
Figure 2:
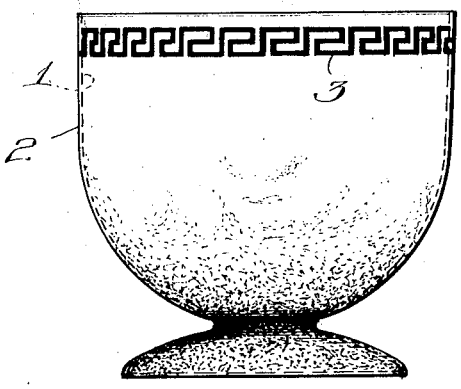
Fig. 2 is a view of the bowl of Fig. 1 ready to be baked or burned.
Figure 3:
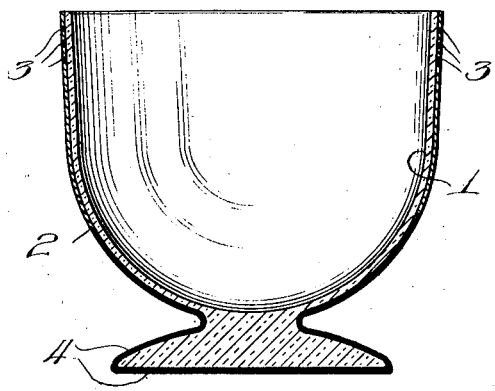
Fig. 3 is a central vertical section taken through the bowl as it appears in Fig. 2.
Figure 4:
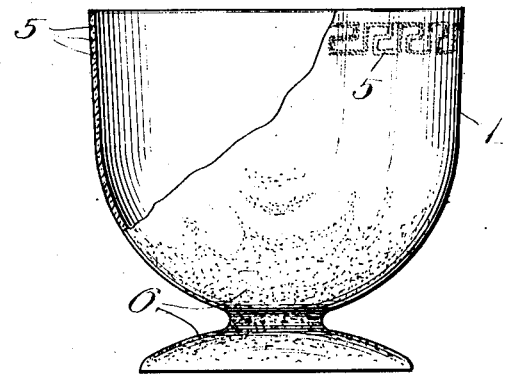
Fig. 4 is a view similar to Fig. 3, showing the bowl after the burning operation, and after the coating layer has been removed.

Referring to the drawing, 1 represents a piece of glass or glazed ceramic ware.

There is first applied to the member 1 a foundation coating, 2, as heretofore explained. The coloring salts or bases are then applied to the foundation layer in any convenient way. Thus, in the example illustrated, there is a set design, 3, placed around the bowl near the top, while a graduated application of coloring material is applied to the lower portion or base of the bowl as indicated at 4. The coloring material which is superimposed upon the foundation layer soaks into the latter until it comes into proximity to the outer surface of the ware. The ware is then burned and, after the coating material is washed away the ware will be found to have around the top a design 5, corresponding to the design 3, while around the bottom or base there will be a decorative stain 6, of a character depending upon the character of the treatment to the lower portion 4, of the bowl; the designs or decorations being in the form of permanent stains.

It will of course be understood that the particular illustration just given is intended only to explain the manner of carrying out my invention and is not intended to define a limited scope; as it will be understood that an infinite variety of decorative effects may be produced by my process. I therefore do not desire to be limited except as indicated in the definitions of my invention constituting the appended claims.

I claim:

1. The process of decorating glass or ceramic ware which consists in applying a porous foundation coating to the surface to be decorated, then applying upon the coating a coloring material in a condition which permits it to penetrate said coating, and then burning or baking.

2. The process of decorating glass or ceramic ware which consists in applying to the surface to be decorated a clay-like staining coating in the usual way, then applying upon the coating a staining material adapted to penetrate the coating and modify the staining effect thereof in the subsequent treatment, and then burning or baking.

3. The process of decorating glass or ceramic ware which consists in applying to the surface to be decorated a suitable clay-like foundation, then applying upon said foundation one or more metallic salts or bases in a condition to penetrate the foundation material, and then burning or baking and finishing in the usual way.

In testimony whereof, I sign this specification.

JOHN W. HASBURG